United States Patent
Goossens et al.

(10) Patent No.: US 9,803,716 B2
(45) Date of Patent: Oct. 31, 2017

(54) TORSIONAL COMPENSATOR BASED ON MAGNETIC RELUCTANCE

(71) Applicant: DANA LIMITED, Maumee, OH (US)

(72) Inventors: Stijn Goossens, Erpe-Mere (BE); Mark R. J. Versteyhe, Oostkamp (BE)

(73) Assignee: Dana Limited, Maumee, OH (US)

( * ) Notice: Subject to any disclaimer, the term of this patent is extended or adjusted under 35 U.S.C. 154(b) by 91 days.

(21) Appl. No.: 14/392,105

(22) PCT Filed: Apr. 22, 2014

(86) PCT No.: PCT/US2014/034874
§ 371 (c)(1),
(2) Date: Oct. 14, 2015

(87) PCT Pub. No.: WO2014/176195
PCT Pub. Date: Oct. 30, 2014

(65) Prior Publication Data
US 2016/0040745 A1 Feb. 11, 2016

Related U.S. Application Data

(60) Provisional application No. 61/814,375, filed on Apr. 22, 2013.

(51) Int. Cl.
*F16F 15/03* (2006.01)

(52) U.S. Cl.
CPC ............ *F16F 15/03* (2013.01); *F16F 15/035* (2013.01)

(58) Field of Classification Search
CPC ...... H02K 21/24; H02K 26/00; H02K 11/215; H02K 1/02; H02K 1/17; H02K 1/27; H02K 21/14; F16D 27/004
See application file for complete search history.

(56) References Cited

U.S. PATENT DOCUMENTS

| 4,766,362 A * | 8/1988 | Sadvary | H02K 21/16 310/90 |
| 4,858,304 A * | 8/1989 | Weldon | H02K 31/02 29/447 |

(Continued)

FOREIGN PATENT DOCUMENTS

| EP | 2562440 A2 | 2/2013 |
| WO | WO 97/08008 A1 | 3/1997 |
| WO | 2014/176195 A1 | 10/2014 |

OTHER PUBLICATIONS

European Patent Office; The International Search Report and Written Opinion; PCT/US2014/034874; dated Sep. 16, 2014; 13 pages; Rijswijk, Netherlands.

*Primary Examiner* — Long T Tran
(74) *Attorney, Agent, or Firm* — Marshall & Melhorn, LLC

(57) ABSTRACT

A torsional compensator for an internal combustion engine is provided. The torsional compensator comprises a rotor portion and a stator portion. The rotor portion is in driving engagement with an output of the internal combustion engine. The first rotor portion comprises at least one of first magnetic array and a first ferromagnetic array. The stator portion is disposed about the rotor portion. The stator portion is coupled to at least one of the internal combustion engine, a transmission, and a compensator housing. The stator portion comprises at least one of a second magnetic array and a second ferromagnetic array. In response to rotation of the rotor portion within the stator portion, a magnetic reluctance force is generated. The magnetic reluctance force applies a torque to the output of the internal combustion engine to dampen a torque ripple of the internal combustion engine.

8 Claims, 6 Drawing Sheets

(56) References Cited

U.S. PATENT DOCUMENTS

| | | | | |
|---|---|---|---|---|
| 5,053,662 A * | 10/1991 | Richter | | F01D 25/04 |
| | | | | 290/40 A |
| 5,163,400 A * | 11/1992 | Yoshioka | | F02D 35/0007 |
| | | | | 123/361 |
| 5,773,904 A * | 6/1998 | Schiebold | | B60K 6/26 |
| | | | | 180/65.25 |
| 6,138,629 A | 10/2000 | Masberg et al. | | |
| 6,149,544 A * | 11/2000 | Masberg | | B60K 6/26 |
| | | | | 180/65.25 |
| 6,179,544 B1 * | 1/2001 | Weseman | | B60P 1/43 |
| | | | | 414/480 |
| 6,281,646 B1 | 8/2001 | Masberg et al. | | |
| 6,833,646 B2 * | 12/2004 | Joong | | B60K 6/26 |
| | | | | 290/40 C |
| 7,034,427 B2 * | 4/2006 | Hirzel | | H02K 21/24 |
| | | | | 310/156.35 |
| 8,760,030 B2 * | 6/2014 | Ross | | H02K 41/06 |
| | | | | 310/156.16 |
| 2004/0041485 A1 * | 3/2004 | Horber | | H02K 21/16 |
| | | | | 310/156.43 |
| 2005/0040728 A1 * | 2/2005 | Hirzel | | H02K 21/24 |
| | | | | 310/268 |
| 2010/0127589 A1 * | 5/2010 | Kummeth | | F16C 32/0438 |
| | | | | 310/90.5 |
| 2011/0298310 A1 * | 12/2011 | Ross | | H02K 41/06 |
| | | | | 310/20 |
| 2013/0216351 A1 | 8/2013 | Griffin | | |
| 2014/0028031 A1 * | 1/2014 | Tsuchiya | | B60K 6/30 |
| | | | | 290/38 B |
| 2014/0077641 A1 * | 3/2014 | Ratte | | H02K 7/108 |
| | | | | 310/78 |
| 2014/0111045 A1 * | 4/2014 | Goepel | | H02K 41/06 |
| | | | | 310/83 |

* cited by examiner

TORSIONAL COMPENSATOR BASED ON MAGNETIC RELUCTANCE

RELATED APPLICATIONS

The present application claims the benefit of U.S. Provisional Application No. 61/814,375 filed on Apr. 22, 2013, which is incorporated herein in its entirety by reference.

FIELD OF THE INVENTION

The present invention relates to internal combustion engines and more specifically to a torsional compensator for use with an internal combustion engine.

BACKGROUND OF THE INVENTION

Due to recent improvements in combustion engine technology, there has been a trend to downsize internal combustion engines used in vehicles. Such improvements also result in more efficient vehicle, while maintaining similar performance characteristics and vehicle form factors favoured by consumers One common improvement used with internal combustion engines is the addition of a supercharger or a turbocharger. Typically, the addition of the supercharger or the turbocharger is used to increase a performance of an engine that has been decreased in displacement or a number of engine cylinders. Such improvements typically result in an increased torque potential of the engine, enabling the use of longer gear ratios in a transmission of the vehicle. The longer gear ratios in the transmission enable a down-speeding of the engine. Engine down-speeding is a practice of operating the engine at lower operating speeds. Such improvements typically result in improved fuel economy, operation near their most efficient level for a greater amount of time compared to conventional engines, and reduced engine emissions.

In some designs, however, engine down-speeding can result in an undesirable increase in torque ripple at low operating speeds of the engine. For example, a significantly increased torque ripple can appear at an engine output when the engine is operating at low idle speeds. The torque ripple is a well-known engine dynamic that results from torque not being delivered constantly, but periodically during each power stroke of the operating cycle of an internal combustion engine. FIG. 1 is a graph illustrating a torque output of an engine during a four stroke cycle of an engine. In the four stroke cycle, the torque ripple happens once every two turns of a crankshaft for each cylinder of the engine. Accordingly, a four cylinder engine will have two torque ripples per crankshaft turn while a three cylinder engine will have three ripples every two crankshaft turns.

An amplitude of the torque ripple also varies with an operating speed of the engine and a load applied to the engine. A phase of the torque ripple varies with an operating speed and a load applied to the engine. Torque ripples can cause many problems for components of the vehicle near the engine, such as but not limited to: increased stress on the components, increased wear on the components, and exposure of the components to severe vibrations. These problems can damage a powertrain of the vehicle and result in poor drivability of the vehicle. In order to reduce the effects of these problems, smooth an operation of the engine, and improve an overall performance of the engine, the torque ripples may be compensated for using an engine balancing method. Many known solutions are available for multi-cylinder engine configurations to reduce or eliminate the stresses and vibration caused by the torque ripples.

Torque ripple compensator devices are known in the art; however, the known device have many shortcomings. In many conventional vehicles, the torque ripples are compensated for using at least one flywheel. FIG. 2 illustrates a conventional flywheel based damping system. In other applications, a dual-mass flywheel system may be used. An inertia of the flywheel dampens a rotational movement of the crankshaft, which facilitates operation of the engine running at a substantially constant speed. Flywheels may also be used in combination with other dampers and absorbers.

A weight of the flywheel, however, can become a factor in such torque ripple compensating devices. A lighter flywheel accelerates faster but also loses speed quicker, while a heavier flywheel retain speeds better compared to the lighter flywheel, but the heavier flywheel is more difficult to slow down. However, a heavier flywheel provides a smoother power delivery, but makes an associated engine less responsive, and an ability to precisely control an operating speed of the engine is reduced.

It would be advantageous to develop a torsional compensator for use with an internal combustion engine able to be adapted for both an amplitude and a phase of a torque ripple while minimizing an interference with an operation of an internal combustion engine.

SUMMARY OF THE INVENTION

Presently provided by the invention, a torsional compensator for use with an internal combustion engine able to be adapted for both an amplitude and a phase of a torque ripple while minimizing an interference with an operation of an internal combustion engine, has surprisingly been discovered.

In one embodiment, the present invention is directed to a torsional compensator for an internal combustion engine. The torsional compensator comprises a rotor portion and a stator portion. The rotor portion is in driving engagement with an output of the internal combustion engine. The first rotor portion comprises at least one of first magnetic array and a first ferromagnetic array. The stator portion is disposed about the rotor portion. The stator portion is coupled to at least one of the internal combustion engine, a transmission, and a compensator housing. The stator portion comprises at least one of a second magnetic array and a second ferromagnetic array. In response to rotation of the rotor portion within the stator portion, a magnetic reluctance force is generated. The magnetic reluctance force applies a torque to the output of the internal combustion engine to dampen a torque ripple of the internal combustion engine.

In another embodiment, the present invention is directed to a torsional compensator for an internal combustion engine. The torsional compensator comprises a central shaft, a first rotor portion, a first stator portion, and a compensator housing. The central shaft is in driving engagement with an output of the internal combustion engine. The first rotor portion is disposed about and in driving engagement with the central shaft. The first rotor portion comprises at least one of first magnetic array and a first ferromagnetic array. The first stator portion is disposed about the first rotor portion. The first stator portion comprises at least one of a second magnetic array and a second ferromagnetic array. The compensator housing is disposed about the first stator portion and the first rotor portion. The first stator portion is coupled to the compensator housing. In response to rotation of the first rotor portion within the first stator portion, a magnetic reluctance force is generated. The magnetic reluctance force applies a torque to the output of the internal combustion engine to dampen a torque ripple of the internal combustion engine.

In yet another embodiment, the present invention is directed to a torsional compensator for an internal combustion engine. The torsional compensator comprises a first rotor portion, a first stator portion, a second rotor portion, and a second stator portion. The first rotor portion is in driving engagement with an output of the internal combustion engine. The first rotor portion comprises at least one of a first array of permanent magnets and a first ferromagnetic array. The first stator portion is disposed about the first rotor portion. The first stator portion is coupled to at least one of the internal combustion engine, a transmission, and a compensator housing. The first stator portion comprises at least one of a second array of permanent magnets and a second ferromagnetic array. The second rotor portion is in driving engagement with the output of the internal combustion engine. The second rotor portion comprises at least one of a third array of permanent magnets and a third ferromagnetic array. A second stator portion is disposed about the second rotor portion. The second stator portion is coupled to at least one of the internal combustion engine, the transmission, and the compensator housing. The second stator portion comprises at least one of a fourth array of permanent magnets and a fourth ferromagnetic array. In response to rotation of the first rotor portion within the first stator portion and the second rotor portion within the second stator portion, a magnetic reluctance force is generated. The magnetic reluctance force applies a torque to the output of the internal combustion engine to dampen a torque ripple of the internal combustion engine.

Various aspects of this invention will become apparent to those skilled in the art from the following detailed description of the preferred embodiment, when read in light of the accompanying drawings.

BRIEF DESCRIPTION OF THE FIGURES

The above, as well as other advantages of the present invention will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
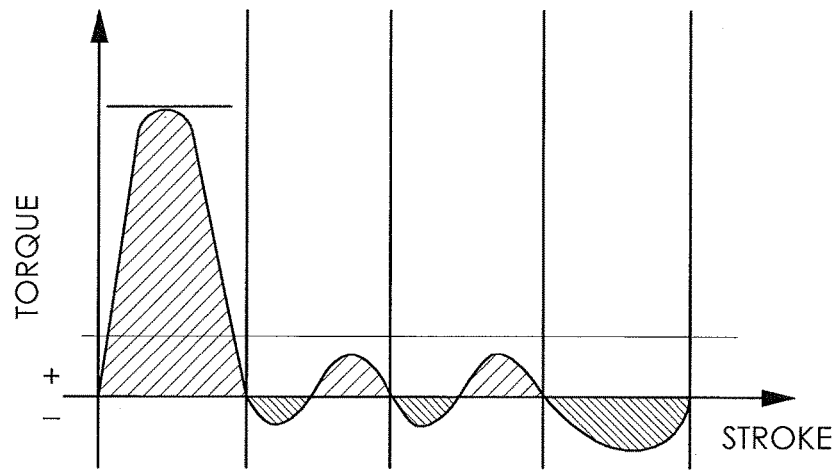
FIG. 1 is a graph illustrating a torque output of an engine during a four stroke cycle of an engine.
Figure 2:
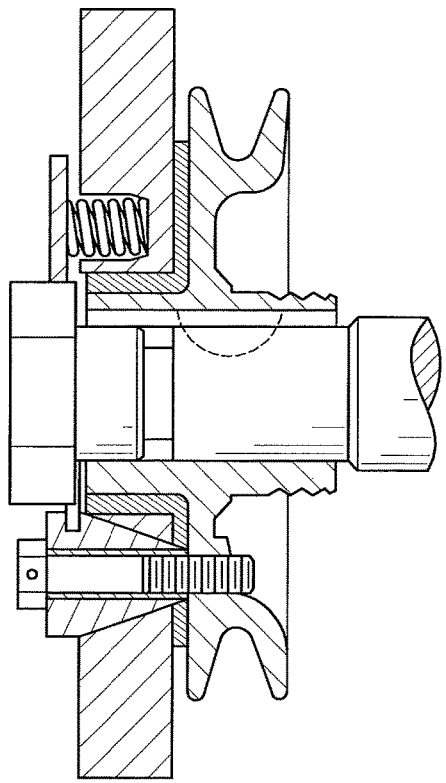
FIG. 2 is a sectional view of a flywheel based damping system known in the prior art.
Figure 3A:
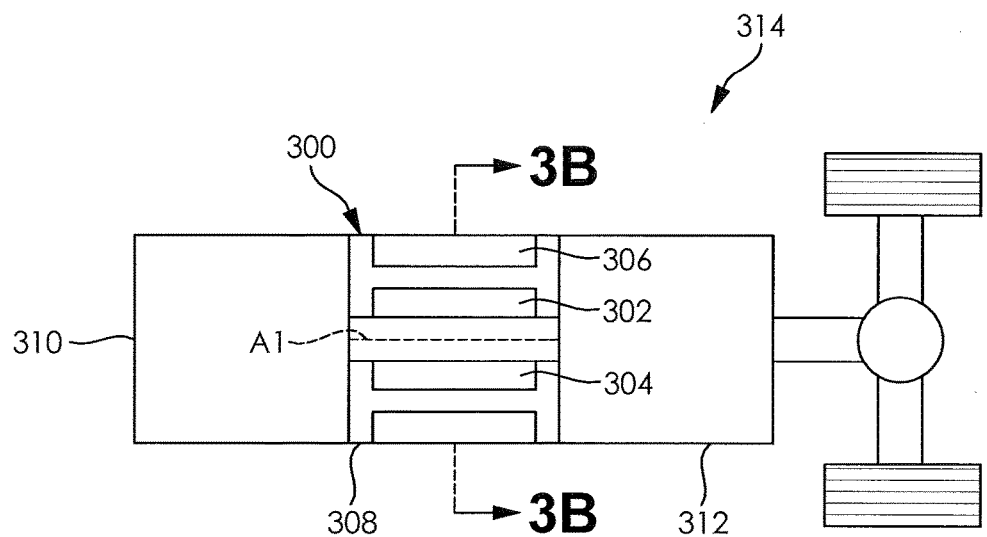
FIG. 3A is a schematic illustration of a torsional compensator according to an embodiment of the present invention.
Figure 3B:
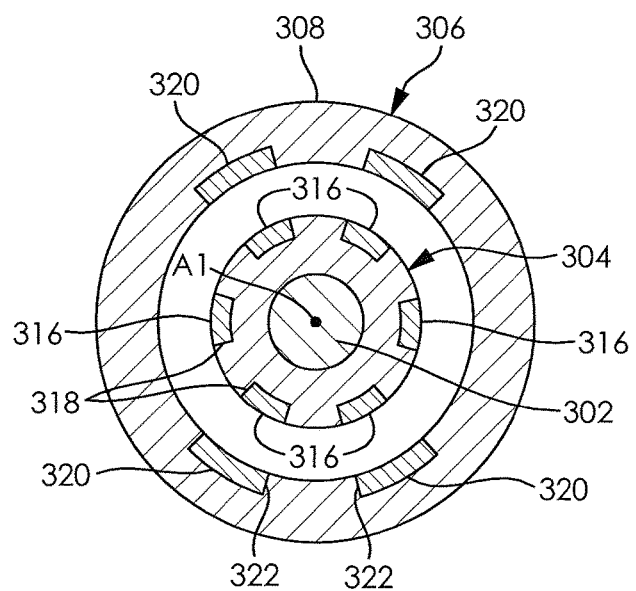
FIG. 3B is a sectional view of the torsional compensator shown in FIG. 3A.

FIGS. 3A and 3B illustrate a torsional compensator 300. The torsional compensator 300 comprises a central shaft 302, a rotor portion 304, a stator portion 306, and a compensator housing 308. The central shaft 302 is in driving engagement with an internal combustion engine 310 and a transmission 312 of a vehicle driveline 314. The rotor portion 304 is in driving engagement with the central shaft 302. The stator portion 306 is coupled to the compensator housing 308. The compensator housing 308 and the stator portion 306 are disposed about the central shaft 302 and the rotor portion 304. The compensator housing 308 is coupled to at least one of the internal combustion engine 310 and the transmission 312.

The central shaft 302 is an elongate member in driving engagement with the internal combustion engine 310 and the transmission 312. The central shaft 302 may form a portion of one of the internal combustion engine 310 and the transmission 312, or the central shaft 302 may be formed separate therefrom. The central shaft 302 may be an output of the internal combustion engine 310. The central shaft 302 is in driving engagement with the internal combustion engine 310 and the transmission 312 through splined connections formed on each end thereof; alternately, it is understood that the central shaft 302 may be in driving engagement with the internal combustion engine 310 and the transmission 312 in any other conventional manner. The central shaft 302 is also in driving engagement with the rotor portion 304 through splined connections formed on a middle portion thereof; alternately, it is understood that the central shaft 302 may be in driving engagement with the rotor portion 304 in any other conventional manner. The central shaft 302 defines a primary axis A1 of the torsional compensator 300.

The rotor portion 304 is a hollow, cylindrical member disposed about and drivingly engaged with the central shaft 302; however, it is understood that the rotor portion 304 may have any other shape suitable for rotation. The rotor portion 304 is formed from a metal and includes a first magnetic array 316 coupled thereto; however, it is understood that the rotor portion 304 may be formed from another rigid material. As shown in FIG. 3B, the rotor portion 304 includes a plurality of recesses 318 into which the first magnetic array 316 is disposed; however, it is understood that the rotor portion 304 may be configured in any manner for coupling the first magnetic array 316 thereto. In the embodiment of the invention shown in FIGS. 3A and 3B, a flux barrier (not shown) is disposed in each of the recesses 318, between the rotor portion 304 and the first magnetic array 316, when the rotor portion 304 is formed from a conductive material. In embodiments of the invention not shown, the rotor portion 304 may be formed from a non-conductive material and the first magnetic array 316 may be disposed on an outer surface of the rotor portion 304.

The first magnetic array 316 comprises a plurality of permanent magnets of any conventional type known in the art; however, it is understood that the first magnetic array 316 may comprise a salient magnetic material. As shown in FIG. 3B, the first magnetic array 316 comprises six permanent magnets; however, it is understood that the first magnetic array 316 may comprise any number of permanent magnets. A polarity of each of magnets of the first magnetic array 316 is similar with respect to the primary axis A1; however, it is understood that other arrangements of the first magnetic array 316 may be used.

The stator portion 306 is a hollow, cylindrical member disposed within and coupled to the compensator housing 308; however, it is understood that the stator portion 306 may have any other shape. The stator portion 306 is formed from a metal and includes a second magnetic array 320 coupled thereto; however, it is understood that the stator portion 306 may be formed from another rigid material. As shown in FIG. 3B, the stator portion 306 includes a plurality of recesses 322 into which the second magnetic array 320 is disposed; however, it is understood that the stator portion 306 may be configured in any manner for coupling the second magnetic array 320 thereto. In the embodiment of the invention shown in FIGS. 3A and 3B, a flux barrier (not shown) is disposed in each of the recesses 322, between the stator portion 306 and the second magnetic array 320, when the stator portion 306 is formed from a conductive material. In embodiments of the invention not shown, the stator portion 306 may be formed from a non-conductive material and the second magnetic array 320 may be disposed on an inner surface of the stator portion 306. Further, it is understood that in embodiments of the invention not shown, one of the first magnetic array 316 and the second magnetic array 320 may comprise a ferromagnetic material.

The second magnetic array 320 comprises a plurality of permanent magnets of any conventional type known in the art; however, it is understood that the second magnetic array 320 may comprise a salient magnetic material. As shown in FIG. 3B, the second magnetic array 320 comprises four permanent magnets; however, it is understood that the second magnetic array 320 may comprise any number of permanent magnets. A polarity of each of magnets of the second magnetic array 320 alternates with respect to the primary axis A1; however, it is understood that other arrangements of the second magnetic array 320 may be used.

The compensator housing 308 is a hollow member formed from a rigid material coupled to at least one of the internal combustion engine 310 and the transmission 312. The compensator housing 308 is disposed about the central shaft 302 and the rotor portion 304. The stator portion 306 is disposed within and coupled to the compensator housing 308 in any conventional manner.

Figure 4A:
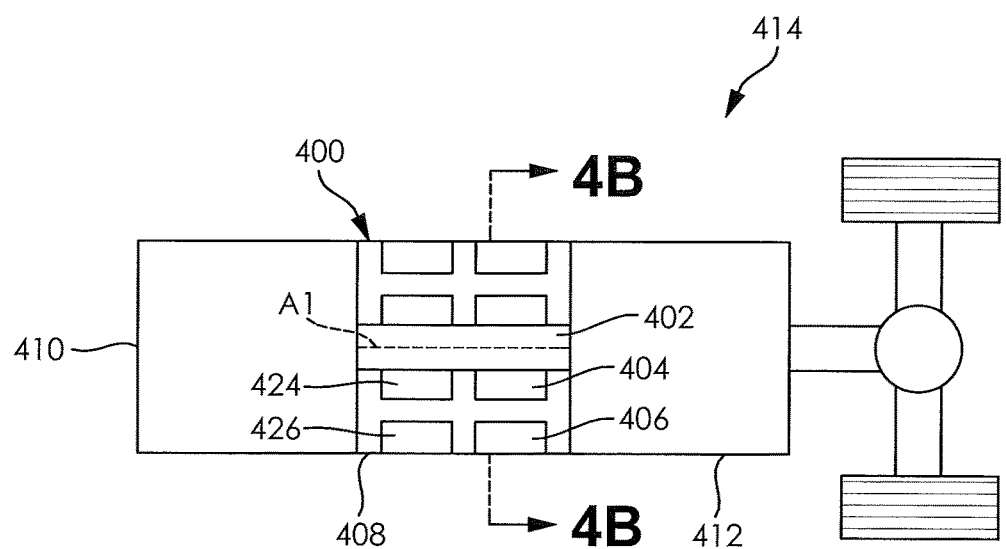
FIG. 4A is a schematic illustration of a torsional compensator according to another embodiment of the present invention.
Figure 4B:
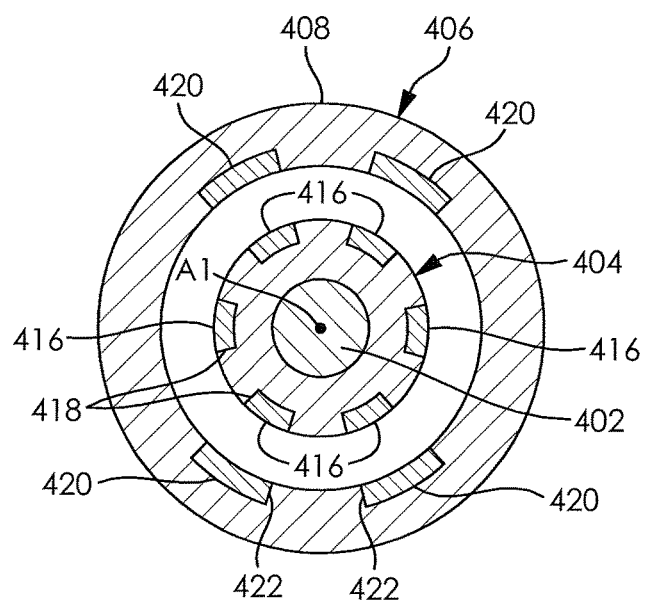
FIG. 4B is a sectional view of the torsional compensator shown in FIG. 4A.

FIGS. 4A and 4B illustrate a torsional compensator 400. The torsional compensator 400 is a variation of the torsional compensator 300, and has similar features thereto. The variation of the invention shown in FIGS. 4A and 4B includes similar components to the torsional compensator 300 illustrated in FIGS. 3A and 3B. Similar features of the variation shown in FIGS. 4A and 4B are numbered similarly in series, with the exception of the features described below.

The torsional compensator 400 comprises a central shaft 402, a first rotor portion 404, a first stator portion 406, a second rotor portion 424, a second stator portion 426, and a compensator housing 408. The central shaft 402 is in driving engagement with an internal combustion engine 410 and a transmission 412 of a vehicle driveline 414. The first rotor portion 404 and the second rotor portion 424 are each in driving engagement with the central shaft 402. The first stator portion 406 and the second stator portion 426 are each coupled to the compensator housing 408. The compensator housing 408, the first stator portion 406, and the second stator portion 426 are disposed about the central shaft 402, the first rotor portion 404, and the second rotor portion 424. The compensator housing 408 is coupled to at least one of the internal combustion engine 410 and the transmission 412.

The central shaft 402 is an elongate member in driving engagement with the internal combustion engine 410 and the transmission 412. The central shaft 402 may form a portion of one of the internal combustion engine 410 and the transmission 412, or the central shaft 402 may be formed separate therefrom. The central shaft 402 may be an output of the internal combustion engine 410. The central shaft 402 is in driving engagement with the internal combustion engine 410 and the transmission 412 through splined connections formed on each end thereof; alternately, it is understood that the central shaft 402 may be in driving engagement with the internal combustion engine 410 and the transmission 412 in any other conventional manner. The central shaft 402 is also in driving engagement with the rotor portions 404, 424 through splined connections formed on a middle portion thereof; alternately, it is understood that the central shaft 402 may be in driving engagement with the rotor portions 404, 424 in any other conventional manner. The central shaft 402 defines a primary axis A1 of the torsional compensator 400.

The first rotor portion 404 is a hollow, cylindrical member disposed about and drivingly engaged with the central shaft 402; however, it is understood that the first rotor portion 404 may have any other shape suitable for rotation. The first rotor portion 404 is formed from a metal and includes a first magnetic array 416 coupled thereto; however, it is understood that the first rotor portion 404 may be formed from another rigid material. As shown in FIG. 4B, the first rotor portion 404 includes a plurality of recesses 418 into which the first magnetic array 416 is disposed; however, it is understood that the first rotor portion 404 may be configured in any manner for coupling the first magnetic array 416 thereto. In the embodiment of the invention shown in FIGS. 4A and 4B, a flux barrier (not shown) is disposed in each of the recesses 418, between the first rotor portion 404 and the first magnetic array 416, when the first rotor portion 404 is formed from a conductive material. In embodiments of the invention not shown, the first rotor portion 404 may be formed from a non-conductive material and the first magnetic array 416 may be disposed on an outer surface of the first rotor portion 404.

The first magnetic array 416 comprises a plurality of permanent magnets of any conventional type known in the art; however, it is understood that the first magnetic array 416 may comprise a salient magnetic material. As shown in FIG. 4B, the first magnetic array 416 comprises six permanent magnets; however, it is understood that the first magnetic array 416 may comprise any number of permanent magnets. A polarity of each of magnets of the first magnetic array 416 is similar with respect to the primary axis A1;

however, it is understood that other arrangements of the first magnetic array 416 may be used.

The first stator portion 406 is a hollow, cylindrical member disposed within and coupled to the compensator housing 408; however, it is understood that the first stator portion 406 may have any other shape. The first stator portion 406 is formed from a metal and includes a second magnetic array 420 coupled thereto; however, it is understood that the first stator portion 406 may be formed from another rigid material. As shown in FIG. 4B, the first stator portion 406 includes a plurality of recesses 422 into which the second magnetic array 420 is disposed; however, it is understood that the first stator portion 406 may be configured in any manner for coupling the second magnetic array 420 thereto. In the embodiment of the invention shown in FIGS. 4A and 4B, a flux barrier (not shown) is disposed in each of the recesses 422, between the first stator portion 406 and the second magnetic array 420, when the first stator portion 406 is formed from a conductive material. In embodiments of the invention not shown, the first stator portion 406 may be formed from a non-conductive material and the second magnetic array 420 may be disposed on an inner surface of the first stator portion 406. Further, it is understood that in embodiments of the invention not shown, one of the first magnetic array 416 and the second magnetic array 420 may comprise a ferromagnetic material.

The second magnetic array 420 comprises a plurality of permanent magnets of any conventional type known in the art; however, it is understood that the second magnetic array 420 may comprise a salient magnetic material. As shown in FIG. 4B, the second magnetic array 420 comprises four permanent magnets; however, it is understood that the second magnetic array 420 may comprise any number of permanent magnets. A polarity of each of magnets of the first magnetic array 416 alternates with respect to the primary axis A1; however, it is understood that other arrangements of the second magnetic array 420 may be used.

The second rotor portion 424 is a hollow, cylindrical member disposed about and drivingly engaged with the central shaft 402, adjacent the first rotor portion 404; however, it is understood that the second rotor portion 424 may have any other shape suitable for rotation. The second rotor portion 424 is formed from a metal and includes a third magnetic array (not shown) coupled thereto; however, it is understood that the second rotor portion 424 may be formed from another rigid material. The second rotor portion 424 includes a plurality of recesses (not shown) into which the third magnetic array is disposed; however, it is understood that the second rotor portion 424 may be configured in any manner for coupling the third magnetic array thereto. In the embodiment of the invention shown in FIGS. 4A and 4B, a flux barrier (not shown) is disposed in each of the recesses, between the second rotor portion 424 and the third magnetic array, when the second rotor portion 424 is formed from a conductive material. In embodiments of the invention not shown, the second rotor portion 424 may be formed from a non-conductive material and the third magnetic array may be disposed on an outer surface of the second rotor portion 424.

The third magnetic array comprises a plurality of permanent magnets of any conventional type known in the art; however, it is understood that the third magnetic array may comprise a salient magnetic material. The third magnetic array comprises six permanent magnets; however, it is understood that the third magnetic array may comprise any number of permanent magnets. Further, a polarity of each of magnets of the third magnetic array is similar with respect to the primary axis A1; however, it is understood that other arrangements of the third magnetic array may be used.

The second stator portion 426 is a hollow, cylindrical member disposed within and coupled to the compensator housing 408; however, it is understood that the second stator portion 426 may have any other shape. The second stator portion 426 is formed from a metal and includes a fourth magnetic array (not shown) coupled thereto; however, it is understood that the second stator portion 426 may be formed from another rigid material. The second stator portion 426 includes a plurality of recesses (not shown) into which the fourth magnetic array is disposed; however, it is understood that the second stator portion may be configured in any manner for coupling the fourth magnetic array thereto. In the embodiment of the invention shown in FIGS. 4A and 4B, a flux barrier (not shown) is disposed in each of the recesses, between the second stator portion 426 and the fourth magnetic array, when the second stator portion 426 is formed from a conductive material. In embodiments of the invention not shown, the second stator portion 426 may be formed from a non-conductive material and the fourth magnetic array may be disposed on an inner surface of the second stator portion 426. Further, it is understood that in embodiments of the invention not shown, one of the third magnetic array and the fourth magnetic array may comprise a ferromagnetic material.

The fourth magnetic array comprises a plurality of permanent magnets of any conventional type known in the art; however, it is understood that the fourth magnetic array may comprise a salient magnetic material. The fourth magnetic array comprises four permanent magnets; however, it is understood that the fourth magnetic array may comprise any number of permanent magnets. Further, a polarity of each of magnets of the fourth magnetic array alternates with respect to the primary axis A1; however, it is understood that other arrangements of the fourth magnetic array may be used.

The compensator housing 408 is a hollow member formed from a rigid material coupled to at least one of the internal combustion engine 410 and the transmission 412. The compensator housing 408 is disposed about the central shaft 402 and the rotor portions 404, 424. The stator portions 406, 426 is disposed within and coupled to the compensator housing 408 in any conventional manner.

Figure 5A:
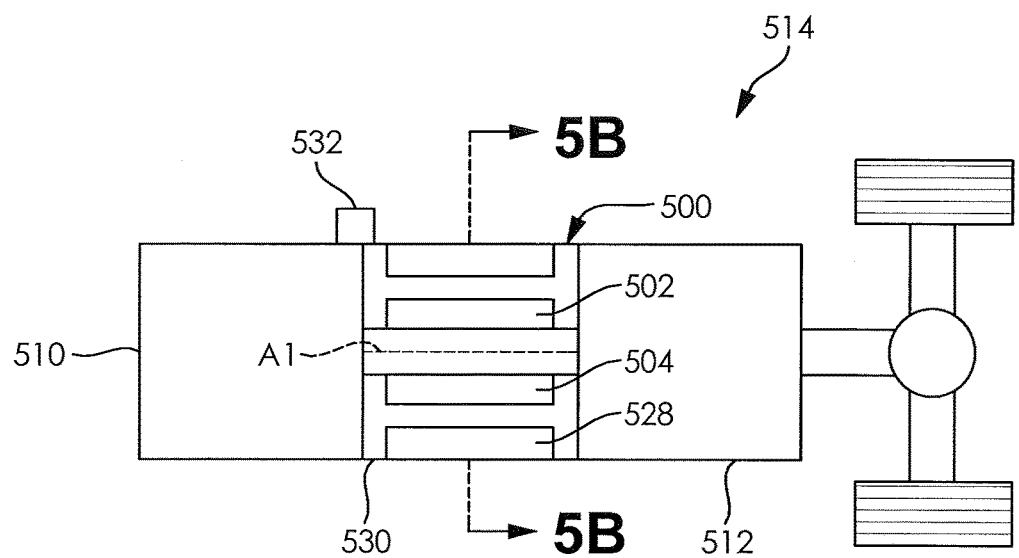
FIG. 5A is a schematic illustration of a torsional compensator according to another embodiment of the present invention.
Figure 5B:
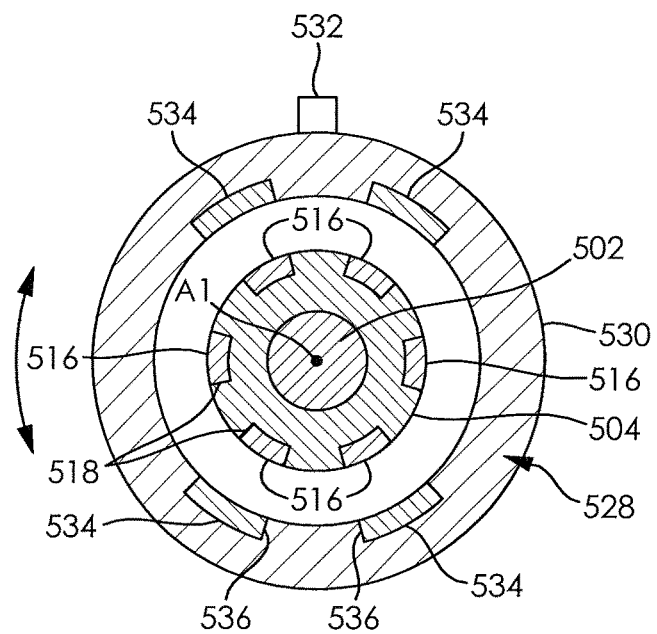
FIG. 5B is a sectional view of the torsional compensator shown in FIG. 5A.

FIGS. 5A and 5B illustrate a torsional compensator 500. The torsional compensator 500 is a variation of the torsional compensator 300, and has similar features thereto. The variation of the invention shown in FIGS. 5A and 5B includes similar components to the torsional compensator 300 illustrated in FIGS. 3A and 3B. Similar features of the variation shown in FIGS. 5A and 5B are numbered similarly in series, with the exception of the features described below.

The torsional compensator 500 comprises a central shaft 502, a rotor portion 504, a stator portion 528, a compensator housing 530, and a stator actuator 532. The central shaft 502 is in driving engagement with an internal combustion engine 510 and a transmission 512 of a vehicle driveline 514. The rotor portion 504 is in driving engagement with the central shaft 502. The stator portion 528 is adjustably coupled to the compensator housing 530. The compensator housing 530 and the stator portion 528 are disposed about the central shaft 502 and the rotor portion 504. The compensator housing 530 is coupled to at least one of the internal combustion engine 510 and the transmission 512.

The stator portion 528 is a hollow, cylindrical member disposed within and adjustably coupled to the compensator housing 530; however, it is understood that the stator portion 528 may have any other shape. The stator portion 528 is formed from a metal and includes a second magnetic array 534 coupled thereto; however, it is understood that the stator portion 528 may be formed from another rigid material. As shown in FIG. 5B, the stator portion 528 includes a plurality of recesses 536 into which the second magnetic array 534 is disposed; however, it is understood that the stator portion 528 may be configured in any manner for coupling the second magnetic array 534 thereto. In response to a force applied thereto by the stator actuator 532, the stator portion 528 may be rotated about the primary axis A1. In the embodiment of the invention shown in FIGS. 5A and 5B, a flux barrier (not shown) is disposed in each of the recesses 536, between the stator portion 528 and the second magnetic array 534, when the stator portion 528 is formed from a conductive material. In embodiments of the invention not shown, the stator portion 528 may be formed from a non-conductive material and the second magnetic array 534 may be disposed on an inner surface of the stator portion 528. Further, it is understood that in embodiments of the invention not shown, one of the first magnetic array 516 and the second magnetic array 534 may comprise a ferromagnetic material.

The second magnetic array 534 comprises a plurality of permanent magnets of any conventional type known in the art; however, it is understood that the second magnetic array 534 may comprise a salient magnetic material. As shown in FIG. 5B, the second magnetic array 534 comprises four permanent magnets; however, it is understood that the second magnetic array 534 may comprise any number of permanent magnets. A polarity of each of magnets of the second magnetic array 534 alternates with respect to the primary axis A1; however, it is understood that other arrangements of the second magnetic array 534 may be used.

The compensator housing 530 is a hollow member formed from a rigid material coupled to at least one of the internal combustion engine 510 and the transmission 512. The compensator housing 530 is disposed about the central shaft 502 and the rotor portion 504. The stator portion 528 is disposed within and adjustably coupled to the compensator housing 530 in any conventional manner.

The stator actuator 532 is an actuating device in driving engagement with the stator portion 528 and at least one of the compensator housing 530, the internal combustion engine 510, and the transmission 512. The stator actuator 532 may be a hydraulic actuator, a pneumatic actuator, a screw driven actuator, or any other type of known actuator. In response to a control signal from a controller (not shown), the stator actuator 532 applies a force to the stator portion 528 to move the stator portion 528 rationally about the primary axis A1, changing a position of the stator portion 528, and thus the second magnetic array 534, with respect to the internal combustion engine 510. It is also understood that the stator actuator 532 may be a passive guide actuator, including at least on biasing member to control a position of the stator portion 528.

Figure 6A:
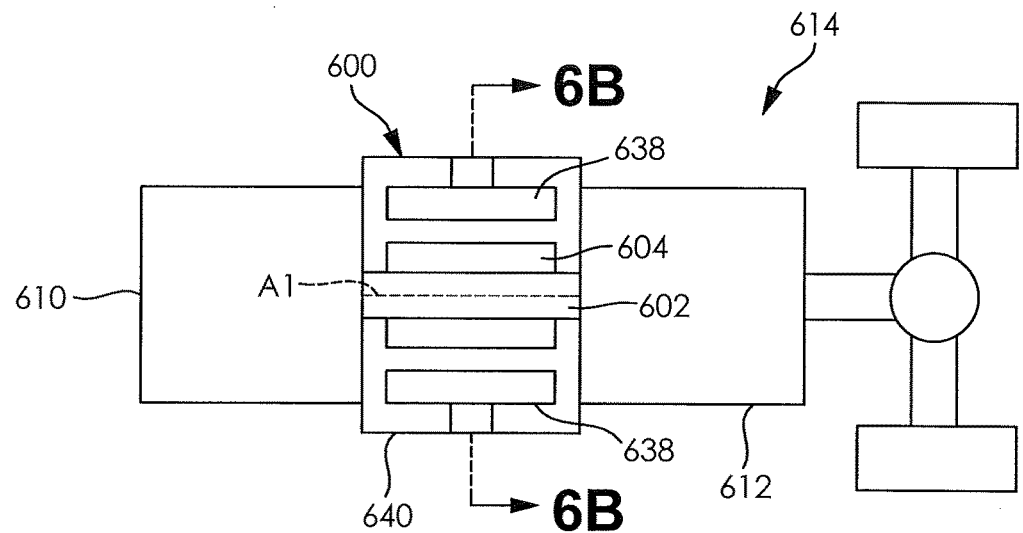
FIG. 6A is a schematic illustration of a torsional compensator according to another embodiment of the present invention.
Figure 6B:
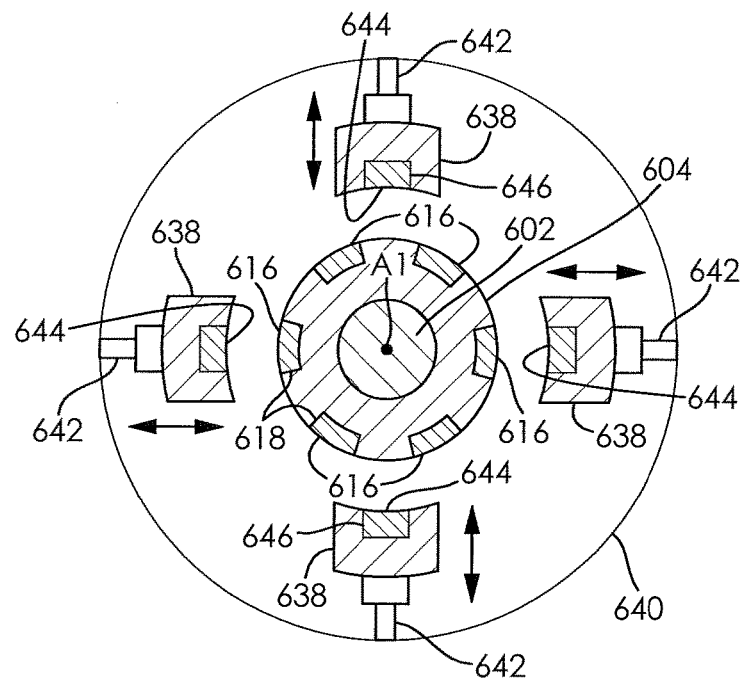
FIG. 6B is a sectional view of the torsional compensator shown in FIG. 6A.

FIGS. 6A and 6B illustrate a torsional compensator 600. The torsional compensator 600 is a variation of the torsional compensator 300, and has similar features thereto. The variation of the invention shown in FIGS. 6A and 6B includes similar components to the torsional compensator 300 illustrated in FIGS. 3A and 3B. Similar features of the variation shown in FIGS. 6A and 6B are numbered similarly in series, with the exception of the features described below.

The torsional compensator 600 comprises a central shaft 602, a rotor portion 604, a plurality of stator portions 638, a compensator housing 640, and a plurality of stator actuators 642. The central shaft 602 is in driving engagement with an internal combustion engine 610 and a transmission 612 of a vehicle driveline 614. The rotor portion 604 is in driving engagement with the central shaft 602. Each of the stator portions 638 is adjustably coupled to the compensator housing 640. The compensator housing 640 and the stator portions 638 are disposed about the central shaft 602 and the rotor portion 604. The compensator housing 640 is coupled to at least one of the internal combustion engine 610 and the transmission 612.

The plurality of stator portions 638 is a plurality of rigid members disposed within and adjustably coupled to the compensator housing 640. The plurality of stator portions 638 are formed from a metal and includes a second magnetic array 644 coupled thereto; however, it is understood that the plurality of stator portions 638 may be formed from another rigid material. As shown in FIG. 6B, each of the stator portions 638 include a recess 646 formed therein into which at least one magnet of the second magnetic array 644 is disposed; however, it is understood that the stator portions 638 may be configured in any manner for coupling the second magnetic array 644 thereto. In response to a force applied thereto by one of the stator actuator 642, each of the stator portions 638 is moved radially inwardly or outwardly from the primary axis A1. In the embodiment of the invention shown in FIGS. 6A and 6B, a flux barrier (not shown) is disposed in each of the recesses 646, between each of the stator portions 638 and each of the magnets of the second magnetic array 644, when each of the stator portions 638 is formed from a conductive material. In embodiments of the invention not shown, each of the stator portions 638 may be formed from a non-conductive material and the each of the magnets of the second magnetic array 644 may be disposed on an inner surface of each of the stator portions 638. Further, it is understood that in embodiments of the invention not shown, one of the first magnetic array 616 and the second magnetic array 644 may comprise a ferromagnetic material.

The second magnetic array 644 comprises a plurality of permanent magnets of any conventional type known in the art; however, it is understood that the second magnetic array 644 may comprise a salient magnetic material. As shown in FIG. 5B, the second magnetic array 644 comprises four permanent magnets; however, it is understood that the second magnetic array 644 may comprise any number of permanent magnets. A polarity of each of magnets of the second magnetic array 644 alternates with respect to the primary axis A1; however, it is understood that other arrangements of the second magnetic array 644 may be used.

The compensator housing 640 is a hollow member formed from a rigid material coupled to at least one of the internal combustion engine 610 and the transmission 612. The compensator housing 640 is disposed about the central shaft 602 and the rotor portion 604. Each of the stator portions 638 is disposed within and adjustably coupled to the compensator housing 640 in any conventional manner.

The plurality of stator actuators 642 is a plurality of actuating devices in driving engagement with the stator portion 638 and at least one of the compensator housing 640, the internal combustion engine 610, and the transmission 612. Each of the stator actuators 642 may be a hydraulic actuator, a pneumatic actuator, a screw driven actuator, or any other type of known actuator. In response to a control signal from a controller (not shown), each of the stator actuators 642 applies a force to one of the stator portions 638 to move the stator portion 638 radially inwardly or outwardly from the primary axis A1, changing a position of the stator portion 638, and thus the second magnetic array 644, with respect to the first magnetic array 616. It is also understood that the plurality of stator actuators 642 may be passive guide actuators, including at least one biasing member to control a position of the plurality of stator portions 638. Further, it is understood that a position of the plurality of stator portions 638 may be controlled using a single actuation device through the use of linkages, cammed surfaces, or similar engagement devices.

Figure 7A:
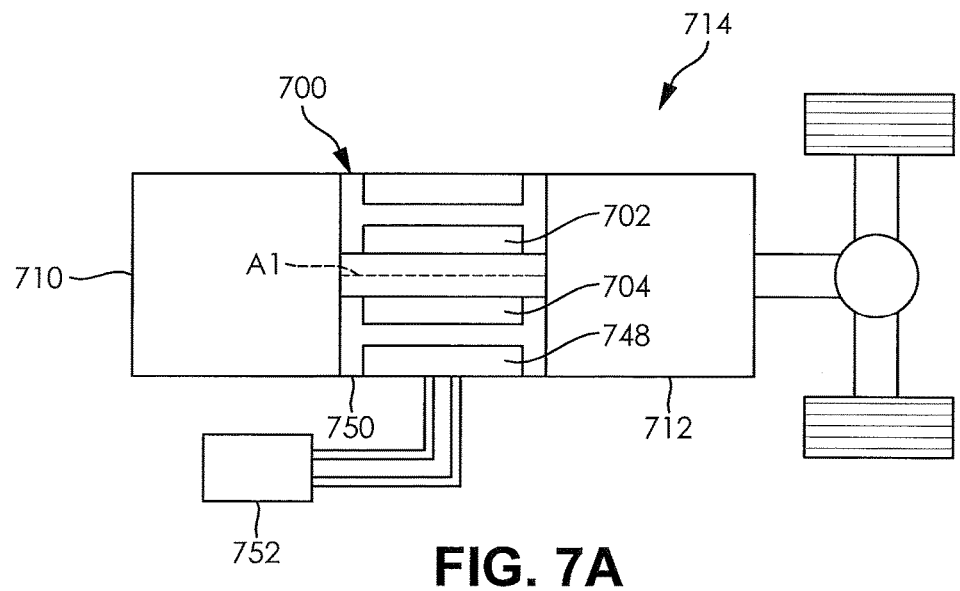
FIG. 7A is a schematic illustration of a torsional compensator according to another embodiment of the present invention.
Figure 7B:
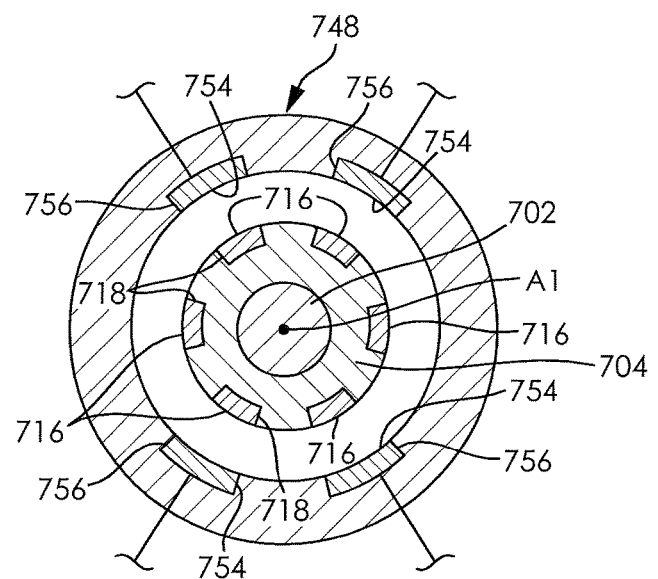
FIG. 7B is a sectional view of the torsional compensator shown in FIG. 7A.

FIGS. 7A and 7B illustrate a torsional compensator 700. The torsional compensator 700 is a variation of the torsional compensator 300, and has similar features thereto. The variation of the invention shown in FIGS. 7A and 7B includes similar components to the torsional compensator 300 illustrated in FIGS. 3A and 3B. Similar features of the variation shown in FIGS. 7A and 7B are numbered similarly in series, with the exception of the features described below.

The torsional compensator 700 comprises a central shaft 702, a rotor portion 704, a stator portion 748, a compensator housing 750, and a stator control system 752. The central shaft 702 is in driving engagement with an internal combustion engine 710 and a transmission 712 of a vehicle driveline 714. The rotor portion 704 is in driving engagement with the central shaft 702. The stator portion 748 is coupled to the compensator housing 750. The compensator housing 750 and the stator portion 748 are disposed about the central shaft 702 and the rotor portion 704. The compensator housing 750 is coupled to at least one of the internal combustion engine 710 and the transmission 712. The stator control system 752 is in electrical communication with the stator portion 748.

The stator portion 748 is a hollow, cylindrical member disposed within and coupled to the compensator housing 750; however, it is understood that the stator portion 748 may have any other shape. The stator portion 748 is formed from a metal and includes an electromagnetic array 754 coupled thereto; however, it is understood that the stator portion 748 may be formed from another rigid material. As shown in FIG. 7B, the stator portion 748 includes a plurality of recesses 756 into which the electromagnetic array 754 is disposed; however, it is understood that the stator portion 748 may be configured in any manner for coupling the electromagnetic array 754 thereto. In the embodiment of the invention shown in FIGS. 7A and 7B, a flux barrier (not shown) is disposed in each of the recesses 756, between the stator portion 748 and the electromagnetic array 754, when the stator portion 748 is formed from a conductive material. In embodiments of the invention not shown, the stator portion 748 may be formed from a non-conductive material and the electromagnetic array 754 may be disposed on an inner surface of the stator portion 748. Further, it is understood that in embodiments of the invention not shown, the first magnetic array 716 may comprise a ferromagnetic material.

The electromagnetic array 754 comprises a plurality of electromagnets in electrical communication with the stator control system 752. As shown in FIG. 7B, the electromagnetic array 754 comprises four electromagnets; however, it is understood that the electromagnetic array 754 may comprise any number of permanent magnets. It is understood that other arrangements of the electromagnetic array 754 may be used, however.

The compensator housing 750 is a hollow member formed from a rigid material coupled to at least one of the internal combustion engine 710 and the transmission 712. The compensator housing 750 is disposed about the central shaft 702 and the rotor portion 704. The stator portion 748 is disposed within and coupled to the compensator housing 750 in any conventional manner.

The stator control system 752 is an electronic device which is in electrical communication with each of the electromagnets of the electromagnetic array 754. In response to at least an operating speed of the internal combustion engine 712, the stator control system 752 adjusts an amount of current applied to at least one of the electromagnets of the electromagnetic array 754. In response to a change of current applied to the electromagnets of the electromagnetic array 754, a magnetic field generated by the electromagnetic array 754 is adjusted. The stator control system 752 may also be in electrical communication with a vehicle control system (not shown).

In use, the torsional compensator 300, 400, 500, 600, 700 dampens a torque ripple generated by the internal combustion engine 312, 412, 512, 612, 712. The torsional compensator 300, 400, 500, 600, 700 is used in parallel with the vehicle driveline 314, 414, 514, 614, 714. Operation of the torsional compensator 300, 400, 500, 600, 700 is based on the principle of magnetic reluctance. When a first permanent magnet is positioned close to a second permanent magnet (or any other magnetic material), a force is generated between the first permanent magnet and the second permanent magnet (or the other magnetic material). The force is called a reluctance force. When changing a relative position of the first permanent magnet with respect to the second permanent magnet (or any other magnetic material), the reluctance force will vary. The closer the distance between the two force generating objects is, the higher the reluctance force will be.

As described hereinabove, the torsional compensator 300 illustrated in FIG. 3 includes the rotor portion 304 having the first magnetic array 316 in driving engagement with the central shaft 302, which is in driving engagement with the internal combustion engine 310. The principles of operation of the torsional compensator 300 described hereinbelow may also be applied to the torsional compensator 400, 500, 600, 700 where applicable. The stator portion 306, which includes the second magnetic array 320, is coupled to the compensator housing 308, which is in driving engagement with one of the internal combustion engine 310 and the transmission 312. Further, it is understood that the stator portion 306 may also be coupled to a non-moving portion of a chassis (not shown) of the vehicle (not shown) including the torsional compensator 300.

By optimizing a number of magnets and a position of the magnetic arrays 316, 320, an amount of torque generated by the torsional compensator 300 can be adjusted to compensate for torque ripples generated by the internal combustion engine 310. By choosing an appropriate ratio of magnets for the magnetic arrays 316, 320, an order of frequency of the torque ripple can also be compensated. Further, it is also understood that a particular combination of magnets for the magnetic arrays 316, 320 may also be used to simultaneously damp several different orders of torque ripples, even torque ripples having varying magnitudes.

When one of the magnets forming the first magnetic array 316 is rotated to be adjacent one of the magnets forming the second magnetic array 320 in a manner that a reluctance force is generated, a torque is applied to the central shaft 302 of the internal combustion engine 310. A sum of all the forces generated by the first magnetic array 316 generates a known torque, depending on a position of the first magnetic array 316 with respect to the second magnetic array 320.

As described hereinabove, the torsional compensator 400 illustrated in FIG. 4 includes a first rotor portion 404, a first stator portion 406, a second rotor portion 424, and a second stator portion 426. The torsional compensator 400 may be used to simultaneously damp several different orders of torque ripples. The second rotor portion 424 and the second stator portion 426 are placed in parallel to the first rotor portion 404 and the first stator portion 406. Further, it is understood that the torsional compensator 400 may comprise additional stators and rotors to obtain a desired torque profile.

As described hereinabove, the torsional compensator 500 illustrated in FIG. 5 includes a stator portion 528 which may be rotated about the primary axis A1 to adjust a phase angle of the torsional compensator 500. A phase angle of the central shaft 502 is a crucial parameter for the torsional compensator 500. An amount of torque generated by the torsional compensator 500 is based on the phase angle to ensure that the torque ripples of the internal combustion engine 510 will be compensated, instead of negatively influencing vibrations. The phase angle may be defined as an angle of the central shaft 502 at which the torque spikes occur, the central shaft 502 in driving engagement with the internal combustion engine 510. A correction phase angle of the torsional compensator 500 can be controlled by rotating a position of the stator portion 528 over a certain angle with respect to a non-rotating reference point, which is defined by the internal combustion engine 510. By rotating the position of the stator portion 528 over the certain angle using the stator actuator 532, described hereinabove, a torque with a different phase angle can be generated.

As described hereinabove, the torsional compensator 600 illustrated in FIG. 6 includes a plurality of stator portions 638, which may be moved radially inwardly or outwardly from the primary axis A1. A distance between the first magnetic array 616 and the second magnetic array 644 is one of the parameters that determine a reluctance force generated by the torsional compensator 600. By adjusting the distance between the first magnetic array 616 and the second magnetic array 644 using the stator actuators 642, an amplitude of a generated torque can be adjusted. The distance between the first magnetic array 616 and the second magnetic array 644 are adjusted using the stator actuators 642, described hereinabove.

In addition to amplitude adjustment, by adjusting the distance between individual magnets of the second magnetic array 644 from the first magnetic array 616, an order of cancellation can, up to a certain degree, also be regulated. The distance between individual magnets of the second magnetic array 644 from the first magnetic array 616 can be adjusted using the using the stator actuators 642, described hereinabove, controlled in an individual manner.

As described hereinabove, the torsional compensator 700 illustrated in FIG. 7 includes the stator portion 748 including the electromagnetic array 754, the electromagnetic array 754 in electrical communication with the stator control system 752. The electromagnetic array 754 is used to generate a magnetic field by applying a current thereto using the stator control system 752. The electromagnetic array 754 offers the benefit of controlling a generated torque profile of the torsional compensator 700 by adjusting a current applied to the electromagnetic array 754. Another advantage of using the electromagnetic array 754 is that each of the electromagnets forming the electromagnetic array 754 may be selectively activated. Selective activation allows adjustment of an order to be damped and also allows a non-integer order to be damped using the torsional compensator 700. As a non-limiting example, a 1.5 order that is generated in a three cylinder engine might be damped by varying which of the electromagnets forming the electromagnetic array 754 are activated each turn in order to have two torque spikes every two turns.

The torsional compensator 300, 400, 500, 600, 700 described hereinabove has many advantages over conventional inertia and damping systems used with internal combustion engines. The torsional compensator 300, 400, 500, 600, 700 provides a torque ripple compensator which is used in parallel to the vehicle driveline 314, 414, 514, 614, 714, as opposed to being an integral portion of the vehicle driveline 314, 414, 514, 614, 714. The torque compensation provided by the torsional compensator 500, 600, 700 can be actively regulated in phase. The torque compensation provided by the torsional compensator 500, 600, 700 can be actively regulated in amplitude. The torsional compensator 300, 400, 500, 600, 700 does not dissipate a greater amount of energy than required or adds additional frictional losses to the vehicle driveline 314, 414, 514, 614, 714. A torque profile generated by the torsional compensator 300, 400, 500, 600, 700 can be adjusted (actively or through a design of the torsional compensator 300, 400) to a desired torque profile. By incorporating the electromagnetic array 754 into the torsional compensator 700, a variable, continuous order of cancellation can be generated. The electromagnetic array 754 allow for a regulating of the phase, the amplitude, and a frequency of the torque profile generated by the torsional compensator 700, without providing a mechanical input to the torsional compensator 700.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A torsional compensator for an internal combustion engine, the torsional compensator comprising:
    a first rotor portion in driving engagement with an output of the internal combustion engine, the first rotor portion comprising at least one of a first magnetic array and a first ferromagnetic array;
    a first stator portion disposed about the first rotor portion, the first stator portion coupled to at least one of the internal combustion engine, a transmission, and a compensator housing, the first stator portion comprising at least one of a second magnetic array and a second ferromagnetic array; and
    a stator actuator in driving engagement with the first stator portion to change a rotational position of the first stator portion about an axis of the first rotor portion, wherein in response to rotation of the first rotor portion within the first stator portion, a magnetic reluctance force is generated, the magnetic reluctance force applying a torque to the output of the internal combustion engine to dampen a torque ripple of the internal combustion engine and in response to the change in rotational position of the first stator portion about an axis of the first rotor portion, a phase angle of the torsional compensator is adjusted.

2. The torsional compensator of claim 1, wherein at least one of the first magnetic array and the second magnetic array each comprises a plurality of permanent magnets.

3. The torsional compensator of claim 1, wherein the stator actuator is also in driving engagement with at least one of the compensator housing, the internal combustion engine, and the transmission.

4. A torsional compensator for an internal combustion engine, the torsional compensator comprising: a first rotor portion in driving engagement with an output of the internal combustion engine, the first rotor portion comprising at least one of a first magnetic array and a first ferromagnetic array; a plurality of stator portions disposed about the first rotor portion, each of the plurality of stator portions coupled to at least one of the internal combustion engine, a transmission, and a compensator housing, the plurality of stator portions comprising at least one of a second magnetic array and a second ferromagnetic array; and a plurality of stator actuators in driving engagement with the plurality of stator portions to continuously change the radial position of the plurality of stator portions relative to an axis of the first rotor portion, wherein in response to rotation of the first rotor portion within the plurality of stator portions, a magnetic reluctance force is generated, the magnetic reluctance force applying a torque to the output of the internal combustion engine to dampen a torque ripple of the internal combustion engine.

5. The torsional compensator of claim 4, wherein at least one of the first magnetic array and the second magnetic array each comprises a plurality of permanent magnets.

6. The torsional compensator of claim 4, wherein the plurality of stator actuators is also in driving engagement with at least one of the compensator housing, the internal combustion engine, and the transmission.

7. The torsional compensator of claim 4, wherein in response to radial movement of the plurality of stator portions from an axis of the first rotor portion, an amplitude of the magnetic reluctance force is adjusted.

8. The torsional compensator of claim 4, wherein in response to radial movement of the plurality of stator portions from an axis of the first rotor portion, an order of cancellation of the magnetic reluctance force is adjusted.

* * * * *